United States Patent [19]
Abe et al.

[11] Patent Number: 5,084,511
[45] Date of Patent: Jan. 28, 1992

[54] THERMOPLASTIC RESIN COMPOSITION

[75] Inventors: Hiroomi Abe; Yasurou Suzuki; Mitsuji Tsuji; Kenji Nagaoka; Takashi Sanada, all of Chiba, Japan

[73] Assignee: Sumitomo Chemical Co., Ltd., Osaka, Japan

[21] Appl. No.: 376,739

[22] Filed: Jul. 7, 1989

[51] Int. Cl.$^5$ .................. C08L 51/04; C08L 71/12
[52] U.S. Cl. .................. 525/68; 525/390; 525/391; 525/396; 525/397; 525/905
[58] Field of Search .......... 525/68, 397, 905, 390, 525/391, 396

[56] References Cited

U.S. PATENT DOCUMENTS

| | | |
|---|---|---|
| 3,379,792 | 4/1968 | Finholt . |
| 4,315,086 | 2/1982 | Ueno et al. . |
| 4,600,741 | 7/1986 | Aycock et al. . |
| 4,654,405 | 3/1987 | Jalbert et al. . |
| 4,659,760 | 4/1987 | van der Meer . |
| 4,659,763 | 4/1987 | Gallucci et al. . |
| 4,732,937 | 3/1988 | Sybert . |

FOREIGN PATENT DOCUMENTS

| | | |
|---|---|---|
| 0024120 | 2/1981 | European Pat. Off. . |
| 0046040 | 2/1982 | European Pat. Off. . |
| 0236593 | 9/1987 | European Pat. Off. . |
| 8707281 | 12/1987 | European Pat. Off. . |
| 0270246 | 6/1988 | European Pat. Off. . |
| 0299619 | 1/1989 | European Pat. Off. . |
| 59-59724 | 4/1984 | Japan . |
| 59-86653 | 5/1984 | Japan . |
| 62-236853 | 10/1987 | Japan . |
| 63-108060 | 5/1988 | Japan . |
| 63-113071 | 5/1988 | Japan . |
| 63205350 | 8/1988 | Japan . |
| 1-139642 | 6/1989 | Japan . |
| 85/05372 | 5/1985 | World Int. Prop. O. . |
| 87/00540 | 1/1987 | World Int. Prop. O. . |
| 88/06173 | 8/1988 | World Int. Prop. O. . |

*Primary Examiner*—Jacob Ziegler
*Attorney, Agent, or Firm*—Cushman, Darby Cushman

[57] ABSTRACT

A novel thermoplastic composition having improved paint adhesion strength and excellent impact strength comprising,
- A) from about 5 to 95 weight % of at least one polyphenylene ether,
- B) from about 95 to 5 weight % of at least one polyamide,
- C) from about 5 to 50 parts by weight based on 100 parts by weight of the total of polyphenylene ether and polyamide, of at least one elastomeric material selected from ethylene α-olefin (diene) copolymers with at least one vinyl aromatic monomer and at least one unsaturated functional monomer selected from unsaturated nitrile monomers and alkyl(meth)acrylates grafted thereto, and
- D) from about 0.01 to 30 parts by weight of at least one compatibilizer, based on 100 parts by weight of the total of polyphenylene ether and polyamide.

17 Claims, No Drawings

THERMOPLASTIC RESIN COMPOSITION

The present invention relates to novel polyphenylene ether polyamide blends having improved paint adhesion strength and excellent impact strength.

Specifically, polyphenylene ether polyamide blends containing at least one elastomeric material selected from ethylene α-olefin (diene) copolymers with a vinyl aromatic monomer and at least one unsaturated functional monomers selected from unsaturated nitrile monomers and alkyl(meth) acrylates grafted thereto as hereinafter defined, have improved impact strength and paint adhesion strength as compared to polyphenylene ether polyamide blends containing at least one ethylene α-olefin (diene) copolymer without such combination of unsaturated monomers grafted thereto, or containing at least one ethylene α-olefin (diene) copolymers with excessive quantity of such unsaturated functional monomers and vinyl aromatic monomers grafted thereto.

Blends of polyphenylene ether and polyamide have long been known. U.S. Pat. No. 3,379,792 taught improved processability of polyphenylene ethers by incorporating therein up to 25% by weight of polyamide.

Recently compatibility of such blends has been enhanced by incorporating therein a compatibilizing agent. U.S. Pat. No. 4,315,086 teaches the use of liquid diene polymers, epoxy compounds and compounds having in the molecule both (a) a carbon-carbon double bond or a carbon-carbon triple bond and (b) a carboxylic acid, acid anhydride, acid amide, imide, carboxylic acid ester, amino or hydroxyl group as compatibilizers. EP 46040 teaches copolymers of vinyl aromatic compounds and either an alpha, beta-unsaturated dicarboxylic acid anhydride or an imide compound thereof as a compatibilizer.

U.S. Pat. No. 4,659,763 teaches the use of quinone compounds, U.S. Pat. No. 4,600,741 teaches the use of trimellitic anhydride acid chloride and the like, U.S. Pat. No. 4,659,760 teaches the use of oxidized polyethylene wax, WO 85/05372 teaches the use of polycarboxylic acids such as citric acid, WO 87/07281 teaches the use of vinyltrimethoxy silane as compatibilizers.

It has also been proposed to add various elastomeric materials to polyphenylene ether polyamide blends to enhance the impact strength.

Among many elastomeric materials, the use of ethylene α-olefin copolymers and ethylene α-olefine diene terpolymers are also proposed. U.S. Pat. No. 4,315,086 teaches the use of acrylic acid grafted ethylene propylene copolymers.

Japanese Kokai Patent TOKKAI SHO 63-33471 teaches the use of maleated ethylene propylene (diene) copolymers, TOKKAI SHO 63-205350 teaches the use of acrylonitrile/styrene grafted ethylene propylene (diene) copolymers, and TOKKAI SHO 63-312350 teaches the use of styrene grafted ethylene propylene (diene) copolymers.

While the use of ethylene α-olefin (diene) copolymers provides a certain advantage over other elastomeric materials to the polypheneylene ether polyamide blends as disclosed in those patents and patent applications, the polyphenylene ether polyamide blends with ethylene α-olefin (diene) copolymers incorporated shows minimal paint adhesion strength if no primer coating layer is applied to a substrate fabricated from those blends.

The use of styrene grafted ethylene α-olefin (diene) copolymers improves the paint adhesion strength over ungrafted ethylene α-olefin (diene) copolymers to some extent but not to a satisfactory level. The use of acrylonitrile/styrene grafted ethylene α-olefin (diene) copolymers were taught in TOKKAI SHO 63-205350. The impact strength of the blends, however, were poor due to the excessive content of styrene and acrylonitrile in the graftomers, although paint adhesion strength was excellent.

It is an objective of the present invention to provide a thermoplastic composition of enhanced paint adhesion and excellent impact strength, comprising polyphenylene ether, polyamide and ethylene α-olefin (diene) copolymer with a vinyl aromatic monomer and an unsaturated functional monomer grafted hereto, by optimizing the content of vinyl aromatic monomer and unsaturated monomer present in the graftomer as hereinafter disclosed.

SUMMARY OF THE INVENTION

According to the present invention, polyphenylene ether polyamide compositions having unexpectedly improved paint adhesion and high impact strength may be prepared by incorporating at least one elastomeric material selected from ethylene α-olefine (diene) copolymers with at least one vinyl aromatic monomer and at least one unsaturated functional monomer selected from unsaturated nitrile monomers and alkyl(meth)acrylates grafted thereto.

In general the compositions of the present invention are prepared from, (A) at least one polyphenylene ether,
(B) at least one polyamide,
(C) at least one elastomeric material selected from ethylene α-olefin (diene) copolymers with at least one vinyl aromatic monomer and at least one unsaturated functional monomer selected from unsaturated nitrile monomers and alkyl(meth) acrylates grafted thereto, the said graftomer consisting of
   a) from about 50 to 90% by weight of at least one of ethylene α-olefin (diene) copolymers
   b) correspondingly from about 50 to 10% by weight of the total of the vinyl aromatic monomer(s) and the unsaturated functional monomer(s), the said unsaturated monomer(s) being present from about 2 to 20% by weight in the total of the polymerized vinyl aromatic monomer(s) and the unsaturated functional monomer(s), and
(D) at least one compatibilizing agent. Especially preferred compatibilizing agents will be selected from the group consisting of
   a) liquid diene polymers
   b) epoxy compounds
   c) unsaturated functional compounds having in the molecule both (a) at least one carbon-carbon double bond or carbon-carbon triple bond and (b) at least one carboxylic acid, acid halide, anhydride, acid anhydride, acid anhydride halide, acid amide, acid ester, imido, amino or hydroxyl group
   d) aliphatic polycarboxylic acid compounds or the derivatives thereof having both (a) a group represented by the formula-(OR) wherein R is hydrogen or an alkyl, aryl, acyl or carbonyl dioxy group and (b) at least two groups, each of which may be the same or different, selected from carboxylic acid, acid halide, acid anhydride, anhydride, acid anhydride halide, acid ester, acid amide, imide amino and salts thereof e) polyfunctional acid halide compounds having both (a) an acid halide group and (b) a group selected from carboxylic acid, carboxylic acid anhydride, acid ester or acid amide The composition of the present invention will generally be prepared from 5 to 95, preferably 30 to 70 percent by weight polyphenylene ether (A), and from about 95 to 5, preferably 70 to 30 percent by weight polyamide (B), 5 to 50, preferably 5 to 30 parts by weight of at least one of the elastomeric materials as herein defined (C), based on 100 parts by weight of the total of the polyphenylene ether and polyamide, and from about 0.01 to 30, preferably from about 0.1 to about 5 parts by weight of at least one compatibilizer (D), based on 100 parts by weight of the total of the polyphenylene ether and polyamide.

DETAILED DESCRIPTION

The polyphenylene ether component (A) used in the present invention is homopolymer or copolymer composed of the following repeating unit (I) or (I) and (II):

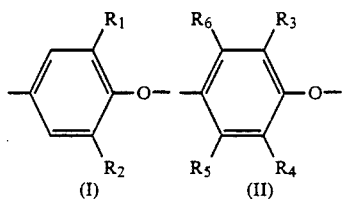

wherein $R_1$, $R_2$, $R_3$, $R_4$ $R_5$ and $R_6$ which may be identical or different each represents a monovalent residue such as an alkyl group of 1–4 carbon atoms excluding tert-butyl group, an aryl group, a halogen atom or a hydrogen atom, and $R_3$ and $R_5$ cannot be simultaneously hydrogen atom.

The polyphenylene ether may be a mixture of said homopolymer and said copolymer, or a graft copolymer of said polymer with styrene.

The homopolymer of polyphenylene ether includes poly(2,6-dimethyl-1,4-phenylene)ether,
poly(2-methyl-6-ethyl-1,4-phenylene)ether,
poly(2,6-dietyl-1,4-phenylene)ether,
poly(2-ethyl-6-n-propyl-1,4-phenylene)ether,
poly(2,6-di-n-propyl-1,4-phenylene)ether,
poly(2-methyl-6-n-butyl-1,4-phenylene)ether,
poly(2-ethyl-6-isopropyl-1,4-phenylene)ether.
poly(2-methyl-6-chloro-1,4-phenylene)ether,
poly(2-methyl-6-hydroxyethyl-1,4-phenylene)ether and
poly(2-methl-6-chloroethyl-1,4-phenylene)ether.

The copolymer of polyphenylene ether includes polyphenylene ether copolymers mainly composed of polyphenylene ether structure which is obtained by copolymerization with o-cresol or an alkyl-substituted phenol such as 2,3,6-trimethylphenol which is represented by the formula (III):

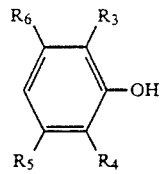

wherein $R_3$, $R_4$, $R_5$ and $R_6$ each represents a monovalent residue such as an alkyl group of 1–4 carbon atoms excluding tert-butyl group, an aryl group, a halogen atom or a hydrogen atom, and $R3$ and $R5$ cannot be simultaneously hydrogen atom.

The polyamide component (B) used in the present invention is well known in the art and may be selected from any of aliphatic polyamides or thermoplastic aromatic copolyamides or a combination thereof. The aliphatic polyamides have a molecular weight of 10,000 or more and can be produced by bonding of equimolar of a saturated aliphatic dicarboxylic acid of 4–12 carbon atoms and an aliphatic diamine of 2–12 carbon atoms. However, in the production, if necessary, the diamines may be excessively used so as to provide more amine terminal groups than carboxyl terminal groups in the polyamide, or alternatively, a dibasic acid may be excessively used so as to provide more acid groups, similarly, these polyamides can be conveniently produced from acid production derivatives and amine production derivatives such as esters, acid chlorides and amine salts, of the above mentioned acids and amines.

Typical examples of the aliphatic dicarboxylic acid used for the production of the polyamides include adipic acid, pimelic acid, azelaic acid, suberic acid, sebacic acid and dodecanedioic acid.

On the other hand, typical examples of the aliphatic diamines include hexamethylenediamine and octamethylanediamine, and the like.

In addition, the aliphatic polyamides may also be produced by self-condensation of lactam.

Examples of the aliphatic polyamides are polyhexamethylene adipamide (nylon 66), polyhexamethylene azelamide (nylon 69), polyhexamethylene sebacamide (nylon 610), polyhexamethylene dodecanamide (nylon 612), poly-bis-(p-aminocyclohexl)methane dodecanoamide, polytetramethylene adipamide (nylon 46) and polyamides produced by ring cleavage of lactam such as polycaprolactam (nylon 6) and polylauryl lactam. Furthermore, there may be used polyamides produced by polymerization of at least two amines or acids selected from those used for the production of the above-mentioned polymers, for example, polymers produced from adipic acid, sebacic acid and hexamethylenediamine. The aliphatic polyamides further include blends of above-mentioned polyamides such as a blend of nylon 6 and nylon 66 including copolymers such as nylon 66/6.

Preferably, the aliphatic polyamides used in the present invention are polyhexamethylene adipamide (nylon 66), polycaprolactam (nylon 6) and a blend of polyhexamethylene adipamide (nylon 66) with poly-caprolactam (nylon 6).

The thermoplastic aromatic copolyamide is a copolyamide containing an aromatic component therein, for example, polyhexamethylene isophthalamide (nylon 6I). The copolyamide containing an aromatic component therein means a melt-polymerizable polyamide containing as a main component an aromatic amino acid and/or an aromatic dicarboxylic acid such as para-aminomethylbenzoic acid, para-aminoethylbenzoic acid, terephthalic acid and isophthalic acid.

Diamines which may constitute another component of the polyamide include hexamethylenediamine, undecamethylenediamine, dodecamethylenediamine, 2,2,4-/2,4,4-trimethylhexamethylenediamine, m-xylylenediamine, p-xylylenediamine, bis(p-aminocyclohexyl)methane, bis(p-aminocyclohexyl)propane, bis(3-methyl-4-aminocyclohexyl)methane, 1,3-bis-(aminomethyl) cyclo-hexane and 1,4-bis(aminomethyl)-cyclohexane. An isocyanate may also be used in place of the diamine.

Any other comonomers may be used, if necessary. Examples of the comonomers are 4,4'-diphenylmethane diisocyanate and tolylene diisocyanate. Other examples thereof are a unit of lactam, a unit of -amino acid of 4–12 carbon atoms, a compound derived from an aliphatic dicarboxylic acid of 4–12 carbon atoms and an aliphatic diamines of 2–12 carbon atoms, for example, lactams and amino acids such as ε-caprolactam, nonalolactam, 11-aminoundecanoic acid and 12-aminododecanoic acid, and equimolar salts of the above-mentioned various diamines and adipic acid, azelaic acid or sebacic acid.

Typical examples of the thermoplastic aromatic copolyamides comprising these components are copolymer polyamide of p-aminomethylbenzoc acid and ε-caprolactam (nylon AMBA/6), polyamides mainly composed of 2,2,4-/2,4,4-trimehylhexamethyl enediamine.terephthalate (nylon TMDT and nylon TMDT/6I), polyamides mainly composed of hexamethylenediamine isophthalate and/or hexamethylenediamine.terephthalate and containing, as a comonomer, bis(p-aminocyclohexyl) methane.terephthalate, and/or bis(3-methyl-4-aminocyclohexyl) methane.isophthalate and/or bis(3-methyl-4-aminocyclohexyl) propane.isophthalate and/or bis(p-aminocyclohexyl) propane.terephthalate (nylon 6I/PACM I, nylon 6I/ DMPACM I, nylon 6I/PACP I, nylon 6I/6T/PACM I/PACM T, nylon 6I/6T/DMPACM I/DMPACM T, nylon 6I/6T/PACP I/PACP T), polyamides mainly composed of hexamethylene-diamine.isophthalate or hexamethylenediamineterephthalate and containing, as a comonomer, ε-caprolactam, 12-aminododecanoic acid, hexamethylenediamine.adipate, bis(p-aminocyclohexyl) methane.adipate or bis(3-methyl, 4-aminocyclohexyl) methane.adipate (nylon 6I, 6I/6T, 6I/12, 6T/6, 6T/66, 6I/PACM 6, 6I/D-MPACM 6), and polyamides mainly composed of bis(p-aminocyclohexyl)methane.isophthalate or bis(3-methyl, 4-aminocyclohexyl)methane-isophthalate and containing, as a comonomer, hexamethylenediamine.dodecanedioate or 12-amino-dodecanoic acid (nylon PACM I/612 and nylon DMPACM I/12)

The aromatic nuclear-hydrogenated copolyamide of component (B) is an alicyclic copolyamide obtained by using cyclohexane-1,4-dicarboxylic acid or cyclohexane-1,3-dicarboxylic acid obtained by nuclear-hydrogenation of terephthalic acid or isophthalic acid in place of terephthalic acid or isophthalic acid which is an acid component of the above-mentioned aromatic copolyamides. Furthermore, nuclearhydrogenation product of diamines or diisocyanates such as 4,4'-diphenylmethane diisocyanate or tolylene diisocyanate, may also be used as a monomer.

The ethylene α-olefin (diene) copolymers useful for the practice of the present invention are well known in the art. The illustrative examples of the ethylene α-olefin (diene) copolymers include ethylene propylene copolymer often called EPR, ethylene propylene 1,4-hexadiene copolymer, ethylene propylene dicyclopentadiene copolymer, ethylene propylene ethylidene norbornen copolymer collectively often called EPDM, ethylene butene-1 copolymer, ethylene butene-1 ethylidene norbornen copolymer and the like.

The term "unsaturated nitrile monomers" used herein means a compound having in its moleculer structure at least one ethylenic carbon-carbon double bond or carbon-carbon triple bond and —CN radical. The preferred unsaturated nitrile monomers are acrylonitrile and methacrylonitrile. The most preferred unsaturated nitrile monomer is acrylonitrile.

Alkyl(meth)acrylates useful for the practice of the present invention are well known in the art. The illustrative example of alkyl(meth)acrylates include methylmethacrylate, ethylmethacrylate butylmethacrylate, glycidylmethacrylate 2-ethylhexylmethacrylate, methylacrylate, ethylacrylate, butylacrylate and the like.

The elastomeric material components(C) used for the practice of the present invention may be prepared by grafting at least one vinyl aromatic monomer and at least one of unsaturated nitrile monomers and/or alkylmethacrylates to at least one of ethylene α-olefin (diene) copolymers.

Method for grafting of such monomers to the ethylene α-olefin (diene) copolymers is not critical in the practice of the present invention and any known method in the art may be employed. Melt mixing of the ethylene α-olefin (diene) copolymers and the grafting monomers with a suitable amount of a free radical initiator may be employed. Grafting of the said monomers under an aqueous suspension of ethylene α-olefin (diene) copolymers with a suitable amount of a free radical initiator and a dispersing agent may also be employed.

In case the content of the unsaturated nitrile monomers and/or alkyl(meth)acrylate(s) in the total of the vinyl aromatic monomer and the unsaturated functional monomer(s) grafted to the ethylene α-olefin (diene) copolymer exceeds about 20% by weight, the impact strength of the polyphenylene ether polyamide blends decreases.

In case the content of the unsaturated nitrile monomer(s) and/or alkyl(meth)acrylate(s) by the same measure is lower than about 2% by weight, the paint adhesion strength is improved only marginally.

In case the content of the total of the unsaturated monomers grafted to the ethylene α-olefin (diene) copolymer in the said unsaturated monomer co-grafted ethylene α-olefine (diene) copolymer (hereinafter referred to as Graft Rubber) exceeds about 50% by weight, the impact strength of the polyphenylene ether polyamide composition goes down remarkably.

In case the content of the total of the unsaturated monomers grafted in Graft Rubber is lower than about 10% by weight the paint adhesion strength is improved only marginally.

Generally the amount of Graft Rubber will be from about 5 to 50, preferably 5 to 30 parts by Weight per 100 parts by weight of the polyphenylene ether polyamide blends.

Graft rubbers may further be functionalized with an unsaturated functional monomer including, but not limited to, maleic anhydride fumaric acid, glycidilmethacrylate acrylamide and the like.

It is within the scope of the present invention to add copolymers of unsaturated nitrile monomers such as acrylonitrile styrene copolymer often called SAN and/or alkyl(meth)acrylate polymers such as polymethylmethacrylate and methylmethacrylate butylacrylate copolymer to further enhance the paint adhesion strength if the need may be.

Examples of preferred compatibilizing agents(D), that may be employed in the practice of the present invention are
 a) liquid diene polymers
 b) epoxy compounds
 c) unsaturated functional compounds
 d) aliphatic polycarboxylic acid compounds or the derivatives thereof as described hereunder and,
 e) polyfunctional acid halide compounds as described hereunder.

Liquid diene polymers suitable for use herein include homopolymers of a conjugated diene and copolymers of a conjugated diene with at least one monomer selected from the group consisting of other conjugated dienes; vinyl monomer, e.g. ethylene, propylene, butene-1, isobutylene, hexene-1, octene-1 and dodecene-1, and mixtures thereof, having a number average molecular weight of from 150 to 10,000 preferably 150 to 5,000. These homopolymers and copolymers include, among others, polybutadiene, polyisoprene, poly(1,3-pentadiene), poly(butadiene-isoprene), poly(styrene-butadiene), polychloroprene, poly(butadiene-alpha methyl styrene), poly(butadiene-styrene-isoprene), poly(butylene-butadiene) and the like.

Epoxy compounds suitable for use in the practice of the present invention there are given (1) epoxy resins produced by condensing polyhydric phenols (e.g. bisphenol-A, tetrabromobisphenol-A, resorcinol and hydroquinone) and epichlorohydrin; (2) epoxy resins produced by condensing polyhydric alcohols (e.g. ethylene glycol, propylene glycol, butylene glycol, polyethylene glycol, polypropylene glycol, pentaerythritol and trimethylolethane and the like) and epichlorohydrin; (3) glycidyletherified products of monohydric compounds including phenyl glycidylether, allyl glycidylether, butyl glycidylether and cresyl glycidylether; (4) glycidyl derivatives of amino compounds for example, the diglycidyl derivative of aniline, and (5) epoxidized products of higher olefinic or cycloalkene, or natural unsaturated oils (e.g. soybean oil) as well as of the foregoing liquid diene polymers.

The unsaturated functional compounds are those having in the molecule both (a) an ethylenic carbon-carbon double bond or a carbon-carbon triple bond and (b) at least one carboxylic acid, acid anhydride, acid halide, anhydride, acid halide anyhydride, acid amide, acid ester, imide, amino, or hydroxy group. Examples of such unsaturated polyfunctional compounds are maleic acid; maleic anhydride; fumaric acid; citranoic acid; itaconic acid; maleimide; maleic hydrazine; reaction products resulting from a diamine and maleic anhydride, maleic acid, fumaric acid, etc.; dichloromaleic anyhdride; maleic acidamide; unsaturated monocarboxylic acid (such as acrylic acid, butenoic acid, methacrylic acid, α-ethylacrylic acid, pentenoic acid); decenoic acids, undecenoic acids, dodecenoic acids, linoleic acid,); esters, acid amides or anhydrides of the foregoing unsaturated carboxylic acids including glycidyl (meth) acrylate; unsaturated alcohols (such as allyl alcohol, crotyl alcohol, methyl vinyl carbonol, 4-pentene-1-ol, 1,4-hexadiene-3-ol, 3-butene-1,4-diol, 2,5-dimethyl-3-hexene-2,5-diol and alcohols of the formula $C_nH_{2n-5}OH$, $C_nH_{2n-7}OH$ and $C_nH_{2n-9}OH$, wherein n is a positive integer up to 30), unsaturated amines resulting from replacing the -OH group(s) of the above unsaturated alcohols with $NH_2$ groups; and functionalized diene polymers and copolymers.

The aliphatic polycarboxylic acid compounds or the derivatives thereof suitable are represented by the formula:

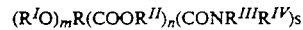

$$(R^IO)_mR(COOR^{II})_n(CONR^{III}R^{IV})_s$$

wherein R is a linear or branched chain, saturated aliphatic hydrocarbon of from 2 to 20, preferably 2 to 10 carbon atoms; $R^I$ is selected from the group consisting of hydrogen or an alkyl, aryl, acyl or carbonyl dioxy group of 1 to 10, preferably 1 to 6, most preferably 1 to 4 carbon atoms, especially preferred is hydrogen; each $R^{II}$ is independently selected from the group consisting of hydrogen or an alkyl or aryl group of from 1 to 20 carbon atoms, preferably from 1 to 10 carbon atoms; each $R^{III}$ and $R^{IV}$ is independently selected from the group consisting essentially of hydrogen or an alkyl or aryl group of from 1 to 10, preferably from 1 to 6, most preferably 1 to 4 carbon atoms; m is equal to 1 and (n+s) is greater than or equal to 2, preferably equal to 2 or 3, and n and s are each greater than or equal to zero and wherein ($OR^I$) is alpha or beta to a carbonyl group and at least two carbonyl groups are separated by 2 to 6 carbon atoms. Obviously, $R^I$, $R^{II}$, $R^{III}$ and $R^{IV}$ cannot be aryl when the respective substituent has less than 6 carbon atoms.

Illustrative examples of suitable polycarboxylic acids are citric acid, malic acid, and agaricic acid.

The polyfunctional acid halide compounds suitable for use herein are characterized as having both (a) at least one acide halide group, preferably acid chloride group and (b) at least one carboxylic acid, carboxylic acid anhydride, acid ester or acid amide group, preferably a carboxylic acid or carboxylic acid anhydride group. Examples of compatibilizers within this group are trimellitic anhydride acid chloride, chloroformyl succinic anhydride, and the like.

The total amount of one or more of the compatibilizing agent used herein will be dependent on the specific compatibilizing agent selected. It is desirable to use at least necessary enough amount in enhancing the compatibility of the polyphenylene ether polyamide blend. Generally the amount of compatibilizing agent will be from about 0.01 to 30, preferably from about 0.1 to about 5 parts by weight per 100 parts by weight of the polyphenylene ether polyamide blend.

Blending method of the components (A), (B) (C) and (D) is not critical. Known melt kneading methods can be employed as the blending method. Extruders, kneaders, rolls and the like may be used. Preferably extruders can be used as melt kneading apparatuses. There is no special limitation in sequence of addition of the components upon melt kneading. That is, there are a method which comprises adding all of the components (A), (B), (C) and (D), at the same time and simultaneously meltkneading them and a method which comprises premeltkneading components (A), (C) and (D) in the presence or absence of a free-radical initiator and then adding component (B) and melt-kneading them. It should be noted, however, that compatibilizer and if employed, a free radical initiator must always be melt kneaded with all or a part of polyphenylene ether.

The foregoing polyphenylene ether polyamide blends may further comprise inorganic fillers such as talc, aluminosilicate, mica, carbon black, glass fiber and the like, pigments, heat stabilizers, ultraviolet degradation inhibitors, antioxidants, flame retardants, plasticizers and the like.

The molded products obtained from the thermoplastic resin composition of the present invention can be used suitably for automobile parts and electrical and electronic parts.

As examples of automobile parts to which the compositon of the present invention can be applied, mention may be made of exterior trim parts such as bumper, fender, apron, hood panel, fascia, rocker panel, rocker panel reinforce, floor panel, rear quarter panel, door panel, door support, roof top, and trunk lid, interior trim parts such as instrument panel, console box, glove box, shift knob, pillar garnish, door trim, handle, arm rest, wind louver, carpet, seat belt, and seat, interior parts of engine room such as distributor cap, air cleaner, radiator tank, battery case, radiator shroud, washer tank, cooling fan, and heater case, mirror body, wheel cover, trunk trim, trunk mat and the like.

The following examples further illustrate the present invention, but the present invention is not limited to them.

PREPARATION OF GRAFT RUBBER

Graft Rubbers used in the examples or comparative examples herein were prepared in the following manner;

1) Graft Rubber A (a styrene/acrylonitrile crafted EPDM)

In a 100 liter stainless steel autoclave, 10 Kg of EPDM (Esprene® E 502 made by Sumitomo Chemical Co., Ltd.) and 45 Kg of demineralized water were fed and intensively stirred by a stirrer.

While stirring, a solution of 75 grams of benzonyl peroxide in 3.35 kg of styrene and 0.2 kg of acrylonitrile, and a solution of 400 grams of polyvinyl alcohol (Gesenol GL-05 made by Nihon Gosei Co., Ltd.) as a dispersion stabilizer in 10 kg of demineralized water were added, in order.

The mixture was stirred for one hour at a room temperature to render the impregnation of styrene, acrylonitrile and benzoyl peroxide into the EPDM. Then, the grafting reaction was allowed at 90 degree centigrade for 6 hours and subsequently at 115 degree centigrade for 2 hours.

After the reaction was over, the resulting product was filtered, washed with water and dried to obtain about 13.3 kg of Graft Rubber (Graft Rubber A).

2) Graft Rubber B

Graft Rubber B was prepared in the same manner as in the preparation of Graft Rubber A except that EPDM was substituted with EPR (Sumitomo Chemical Co., Ltd.'s Esprene E-100).

3) Graft Rubber C

Graft Rubber C was prepared in the same manner as in the preparation of Graft Rubber A except that acrylonitrile was substituted with methylmethacrylate.

4) Graft Rubbers D through J

Graft Rubbers D through J were prepared in the same manner as in the preparation of Graft Rubber A except that the quantity of styrene and acrylonitrile charged were changed as shown in each column of Table-I, and that the quantity of benzoyl peroxide was adjusted in proportion to the total quantity of styrene and the functional monomer.

The content of ethylene α-olefin (diene) copolymer in Graft Rubbers and the content of the functional monomer in the total of polymerized styrene and the polymerized functional monomer present in Graft Rubbers were shown in Table-I.

PREPARATION OF POLYPHENYLENE ETHER POLYAMIDE BLENDS

In the preparation of the polyphenylene ether polyamide blends disclosed in the example herein, a twin screw extruder TEX44 made by Nippon Seikosho Kabushiki Kaisha was used.

The extruder had L/D ratio of 32 and was equipped with a first feed opening at the position of L/D ratio of 1 and with a second feed opening at the position of L/D ratio of 16. (L: the length of the screw, D: the diameter of the screw)

The cylinder temperature was set at about 260° C. and screw speed was set at 360 rpm. The formulation of the individual blend was shown in Table-II. The paint adhesion strength and Izod Impact Strength measured of each blend were also shown in Table-II.

In Table-II, compatibilizer and free radical initiator were shown in parts by weight per 100 parts of the total of the polymeric materials and each of the polymeric materials was shown in weight % of the total of the polymeric materials.

The ingredients listed in the column "Feed-1" of Table-II were fed from the first feed opening. The ingredients listed in the column "Feed-2" of Table-II were fed from the second feed opening. All ingredients fed together either from the first feed opening or the second feed opening were mixed well by a tumbler mixer prior to the feeding.

The feed rate of the first feed and the second feed were controlled by the automatic weight feed control system so as to maintain the formulation of the individual blend as specified in Table-II.

The polyphenylene ether employed in the examples was either polyphenylene ether having a reduced viscosity of 0.52 dl/g, (hereinafter denoted as PPE-A) or polyphenylene ether having a reduced viscosity of 0.42 dl/g (hereinafter denoted as PPE-B) measured at 25° C. in a chloroform solution of 0.5 g/dl concentration manufactured by Nippon Polyether Kabushiki Kaisha.

The polyamaide 6, if employed, was Unitika Kabushiki Kaisha's Nylon 6 A1030 BRL throughout the examples. The polyamide 66, if employed, was UBE Kosan Kabushiki Kaisha's UBE nylon 66 2015B.

The aromatic polyamides in the examples, if employed, was Huels AG's Trogamid® T 2010.

Polymethylmethacrylate, if employed in any of the examples was Sumitomo Chemical Co., Ltd.'s Sumipex® LG. Acrylonitrile styrene copolymer, if employed in any of the examples was Sumitomo Naugatuck Co., Ltd.'s Clearpet® 1,000.

The free radical initiator, if employed, was dicumyl peroxide, Sanperox® DCP made by Sanken Kako Kabushiki Kaisha. The free radical initiator, if employed, was always preblended with polyphenylene ether and fed from the first feed opening. Polyphenylene ether was always fed from the first feed opening and polyamides were always fed from the second opening.

The paint adhesion test was performed in the following manner;

1) The granules of each of the blends prepared according to the formulation listed in Table-II to be tested were always dried at 100 degree centigrade for 6 hours with preheated dry air stream, the dew point of which was about −40 degree centigrade, and cooled thereafter by room temperature dry air stream.

2) The blend granules were injection molded to form a test plates of 150 milimeter × 150 milimeter × 3 milimeter size at a temperature range of about 290 degree centigrade.

3) The resulting plates were subjected to a paint spray utilizing a paint spray gun to form a paint layer of about 25 microns.

4) The paint coated plates were then cured for 30 minutes at 70 degree centigrade in a infrared paint cure oven.

5) The paint layer peeling test was performed, 2 hr, 5 hr, 12 hr, and 24 hr after the paint curing.

The cured paint layer was cross cut by a sharp edged knife so as to make one hundred of 2 mm by 2 mm square pieces of the layer. Then a sheet of adhesive tape was applied on to the cross cut surface and the tape was peeled off.

The paint adhesion strength was measured by counting the number of about 2 mm by 2 mm square pieces remained unpeeled off, out of the 100 cross cut pieces.

6) The paint used in the examples was "Origiplate Z-NY metalic silver" manufactured by Origin Denki Kabushiki Kaisha.

The impact strength of the blends were measured in terms of Izod Impact Strength according to the method specified in ASTM D-256.

EXAMPLE-1

20 Kg of polyphenylene ether (PPE-A), 0.25 Kg of maleic anhydride (MAH), 5 grams of dicumylperoxide (DCP), and 5 Kg of Graft Rubber A were premixed as prescribed in the Feed-1 column of Example-1 of Table-II, using a 100 liter tumbler mixer blending the ingredients for 3 minutes prior to the feeding to the first feed opening of the TEX-44 twin screw extruder.

The premix prepared for the first feed opening will be referred to as the first feed premix hereinafter. 20 Kg of the nylon 6 and 5 Kg of the nylon 66 were premixed as prescribed in the Feed-2 column of Example-1 of Table-II using the same tumbler mixer for 3 minutes prior to the feeding to the second feed opening of the TEX-44 twin screw extruder.

The premix prepared for the second feed opening will be referred to as the second feed premix hereinafter. The cylinder temperature of the extruder was set at about 260° C. and the screw speed, at about 360 rpm. The first feed premix was fed to the first feed opening at a rate of 20.2 Kg/Hr and the second feed premix was fed to the second feed opening at a rate of 20 Kg/Hr so as to maintain the formulation of the ingredients shown in Example-1.

The resulting blend was cooled in a water bath by chilled water of about 10° C. and pelletized and dried. Thus prepared blend granules were injection molded to make 5 plates of 150 mm × 150 mm × 30 mm test specimen.

The paint adhesion strength was tested with 5 of the plates according to the test method described before. The average of the paint adhesion strength measured of the five plates was shown in the Table II. Izod Impact Strength measured was also shown in Table II

EXAMPLE-2

The experiment was conducted in the same manner as in Example-1 except that Graft Rubber A was substituted with Graft Rubber B.

EXAMPLE-3

The experiment was conducted in the same manner as in Example-1 except that Graft Rubber A was substituted with Graft Rubber C and the blend of polyamid 6 and polyamid 66 was substituted with polyamide 6, as shown in Example-3 of Table II.

EXAMPLE-4

The experiment was conducted in the same manner as in Example-2 except that 1 kg out of 20 kg of polyphenylene ether was substituted with PMMA, as shown in Example-4 of Table II.

EXAMPLE-5

The experiment was conducted in the same manner as in Example-4 except that PMMA was substituted with the same amount of acrylonitrile styrene copolymer (SAN) as shown in Example-5 of Table-II.

COMPARATIVE EXAMPLE-1

The experiment was conducted in the same manner as in Example-1 except that Graft Rubber A was substituted with Graft Rubber F.

COMPARATIVE EXAMPLE-2

The experiment was conducted in the same manner as in Example-1 except that Graft Rubber A was substituted with Graft Rubber G.

EXAMPLES 6 through 7 and Comparative

Examples 3 through 7 were conducted in the same manner as in Example 1 except that;

(1) about 20.2 kg each of the first feed premix was prepared according to the formulation shown in Feed-1 column of each of the examples, and evenly charged to the first feed opening of the extruder at a rate of 20.2 Kg/Hr.

(2) 20 kg each of the second feed premix was prepared according to the formulation shown in Feed-2 column of each of the examples, and evenly charged to the first feed opening of the extruder at a rate of 20 Kg/Hr.

TABLE I

| | Material charged | | | | Analytical Result of Graft Rubbers | | |
|---|---|---|---|---|---|---|---|
| | Ethylene α-olefine copolymer | | Styrene | AN[(1)] | MMA[(2)] | Ethylene α-olefine copolymer | AN[(1)] | MMA[(2)] |
| | Species | weight (kg) | (kg) | (kg) | (kg) | wt % | wt %[(3)] | wt %[(3)] |
| A | EPDM | 10 | 3.35 | 0.20 | — | 75.3 | 5.1 | — |
| B | EPR | 10 | 3.35 | 0.20 | — | 76.0 | 4.8 | — |
| C | EPDM | 10 | 3.35 | — | 0.20 | 74.9 | — | 5.6 |
| D | " | 12 | 1.44 | 0.09 | — | 89.6 | 4.9 | — |

TABLE I-continued

| | Material charged | | | | Analytical Result of Graft Rubbers | | |
|---|---|---|---|---|---|---|---|
| | Ethylene α-olefine copolymer | Styrene | AN(1) | MMA(2) | Ethylene α-olefine copolymer | AN(1) | MMA(2) |
| | Species | weight (kg) | (kg) | (kg) | (kg) | wt % | wt %(3) | wt %(3) |
| E | " | 8 | 5.0 | 0.80 | — | 61.2 | 12.5 | — |
| F | " | 10 | 4.0 | — | — | 71.0 | — | — |
| G | " | 10 | 2.88 | 0.97 | — | 75.2 | 27.7 | — |
| H | " | 8 | 4.4 | 1.2 | — | 60.5 | 22.4 | — |
| I | " | 4 | 7.4 | 0.44 | — | 35.2 | 8.1 | — |
| J | " | 10 | 0.5 | 0.05 | — | 96.0 | 7.5 | — |

(1)Acrylonitrile
(2)methylmethacrylate
(3)calculated by the formula: 100 × AN(MMA)/[AN(MMA) + styrene]

TABLE II

| | | Example (EX) 1 | EX 2 | EX 3 | EX 4 | EX 5 | Comparative EX 1 | Comparative EX 2 | EX 6 |
|---|---|---|---|---|---|---|---|---|---|
| Feed-1 | PPE-A | 40 | 40 | 40 | 38 | 38 | 40 | 40 | — |
| | PPE-B | — | — | — | — | — | — | — | 35 |
| | Compatibilizer | MAH* 0.5 | MAH* 0.5 | MAH* 0.5 | MAH* 0.5 | MAH* 0.5 | MAH* 0.5 | MAH* 0.5 | Citric acid 0.5 |
| | Freeradical initiator | 0.01 | 0.01 | — | — | — | — | — | — |
| | Graft Rubber | A 10 | B 10 | C 10 | B 10 | B 10 | F 10 | G 10 | D 15 |
| | PMMA | — | — | — | 2 | — | — | — | — |
| | SAN | — | — | — | — | 2 | — | — | — |
| Feed-2 | Nylon 6 | 40 | 40 | 50 | 50 | 50 | 50 | 50 | 50 |
| | Nylon 66 | 10 | 10 | — | — | — | — | — | — |
| | Aromatic polyamide (Trogamid) | — | — | — | — | — | — | — | — |
| | Izod Impact strength (ASTM D-256) | | | | | | | | |
| | −23° C. (kg·cm/cm) | 22 | 23 | 46 | 41 | 39 | 48 | 13 | 27 |
| | −30° C. (kg·cm/cm) (3.2 t) | 10 | 10 | 12 | 11 | 10 | 12 | 8.3 | 12 |
| | Paint 2 hr | 52 | 46 | 15 | 82 | 95 | 0 | 75 | 12 |
| | adhesion 5 hr | 80 | 73 | 49 | 94 | 99 | 23 | 91 | 40 |
| | strength 12 hr | 96 | 94 | 89 | 99.4 | 100 | 41 | 99.9 | 85 |
| | 24 hr | 100 | 99.9 | 99.2 | 100 | 100 | 59 | 100 | 99.0 |

| | | Comparative EX 3 | EX 7 | Comparative EX 4 | EX (EX) 5 | Comparative EX 6 | EX 8 | Comparative EX 7 |
|---|---|---|---|---|---|---|---|---|
| Feed-1 | PPE-A | — | 40 | 40 | 40 | 40 | 40 | 40 |
| | PPE-B | 35 | — | — | — | — | — | — |
| | Compatibilizer | Citric acid 0.5 | Fumaric acid 0.5 | Fumaric acid 0.5 | MAH* 0.5 | MAH* 0.5 | MAH* 0.5 | MAH* 0.5 |
| | Freeradical initiator | — | 0.01 | 0.01 | 0.01 | 0.01 | — | — |
| | Graft Rubber | J 15 | E 10 | H 10 | I 10 | mEPR** 10 | C 10 | F 10 |
| | PMMA | — | — | — | — | — | — | — |
| | SAN | — | — | — | — | — | — | — |
| Feed-2 | Nylon 6 | 50 | 50 | 50 | 50 | 50 | 45 | 45 |
| | Nylon 66 | — | — | — | — | — | — | — |
| | Aromatic polyamide (Trogamid) | — | — | — | — | — | 5 | 5 |
| | Izod Impact strength (ASTM D-256) | | | | | | | | |
| | −23° C. (kg·cm/cm) | 29 | 38 | 10 | 10 | 57 | 45 | 46 |
| | −30° C. (kg·cm/cm) (3.2 t) | 13 | 7.5 | 7 | 4.5 | 13 | 11 | 12 |
| | Paint 2 hr | 0 | 63 | 72 | 78 | 0 | 20 | 0 |

TABLE II-continued

| | | | | | | | | |
|---|---|---|---|---|---|---|---|---|
| adhesion | 5 hr | 22 | 85 | 90 | 95 | 0 | 58 | 12 |
| strength | 12 hr | 51 | 98 | 99.7 | 99.9 | 0 | 93 | 29 |
| | 24 hr | 74 | 100 | 100 | 100 | 0 | 99.6 | 54 |

*Maleic Anhydride
**Maleated EPR

We claim:

1. A thermoplastic composition having improved paint adhesion strength comprising,
   (A) from about 5 to 95 weight percent of at least one polyphenylene ether,
   (B) from about 95 to 5 weight percent of at least one polyamide,
   (C) from about 5 to 50 parts by weight based on 100 parts by weight of the total of polyphenylene ether and polyamide, of at least one elastomeric material which is ethylene α-olefin (diene) copolymers with at least one vinyl aromatic monomer and at least one unsaturated functional monomer selected from the group consisting of unsaturated nitrile monomers and alkyl(meth)acrylates grafted thereto, the said elastomeric material consisting of
   a) from about 50 to 90 percent by weight of at least one of the ethylene α-olefin (diene) copolymers
   b) correspondingly from about 50 to 10 percent by weight of the total of the vinyl aromatic monomer(s) and the unsaturated functional monomer(s), the said unsaturated functional monomer(s) being present from about 2 to 20 percent by weight in the total of the polymerized vinyl aromatic monomer(s) and the unsaturated functional monomer(s), and
   (D) from about 0.01 to 30 parts by weight of at least one agent capable of compatibilizing (A) and (B) above, based on 100 parts by weight of the total of the polyphenylene ether and polyamide.

2. A thermoplastic composition according to claim 1 wherein polyphenylene ether is poly(2,6-dimethyl-1,4-phenylene) ether or a copolymer of 2,6-dimethylphenol and 2,3,6-trimethylphenol or a combination thereof.

3. A thermoplastic composition according to claim 2 wherein polyamide is polyamide 6.

4. A thermoplastic composition according to claim 2 wherein polyamide is polyamide 66.

5. A thermoplastic composition according to claim 2 wherein polyamide is a blend of polyamide 6 and polyamide 66.

6. A thermoplastic composition according to claim 2 wherein polyamide is an amorphous polyamide.

7. A thermoplastic composition according to claim 2 wherein polyamide is a blend of polyamide 6 and an amorphous polyamide.

8. A thermoplastic composition according to claim 2 wherein polyamide is a blend of polyamide 66 and an amorphous polyamide.

9. A thermoplastic composition according to claims 3 through 8 wherein polyamide is present in the amount at least enough to form the continuous phase of the polyphenylene ether polyamide blend.

10. A thermoplastic composition according to claim 9 wherein vinyl aromatic compound is styrene.

11. A thermoplastic composition according to claim 10 wherein unsaturated functional monomer is acrylonitrile.

12. A thermoplastic composition according to claim 10 wherein unsaturated functional monomer is an alkyl(meth)acrylate.

13. A thermoplastic composition according to claims 10 through 12 wherein ethylene α-olefin (diene) copolymer is ethylene propylene copolymer.

14. A thermoplastic composition according to claim 10 wherein the ethylene α-olefin (diene) copolymer is ethylene butene-1 copolymer.

15. A thermoplastic composition according to claim 10 wherein the ethylene α-olefin (diene) copolymer is ethylene propylene ethylidenenorbornen copolymer.

16. A thermoplastic composition according to claim 10 wherein the ethylene α-olefin (diene) copolymer is ethylene propylene cyclopentadiene copolymer.

17. A thermoplastic composition according to claim 10 wherein the ethylene α-olefin (diene) copolymer is ethylene propylene 1,4-hexadiene copolymer.

* * * * *